(12) United States Patent
Jonsson (10) Patent No.: US 8,151,960 B2
(45) Date of Patent: Apr. 10, 2012

(54) METHOD AND DEVICE FOR TORQUE TRANSMISSION

(75) Inventor: Arne F Jonsson, Hagfors (SE)

(73) Assignee: Barke Invent AB, Soderbarke (SE)

( * ) Notice: Subject to any disclaimer, the term of this patent is extended or adjusted under 35 U.S.C. 154(b) by 130 days.

(21) Appl. No.: 12/094,182

(22) PCT Filed: Oct. 22, 2007

(86) PCT No.: PCT/SE2007/050763
§ 371 (c)(1),
(2), (4) Date: May 29, 2008

(87) PCT Pub. No.: WO2008/066469
PCT Pub. Date: Jun. 5, 2008

(65) Prior Publication Data
US 2010/0219033 A1    Sep. 2, 2010

(30) Foreign Application Priority Data
Nov. 28, 2006  (SE) ...................... 0602539

(51) Int. Cl.
F16D 1/08     (2006.01)
F16D 15/00    (2006.01)
F16D 41/07    (2006.01)

(52) U.S. Cl. ................. 192/45.1; 192/72; 192/107 T (58) Field of Classification Search ............ 192/37, 192/43, 41 A, 72, 107 T
See application file for complete search history.

(56) References Cited

U.S. PATENT DOCUMENTS

| 2,881,886 | A  | * | 4/1959  | Troendly et al. | 192/45.1 |
| 3,353,639 | A  |   | 11/1967 | Andriussi       |          |
| 4,569,614 | A  |   | 2/1986  | Yamauchi        |          |
| 4,809,831 | A  |   | 3/1989  | Kinoshita       |          |
| 4,960,189 | A  |   | 10/1990 | Ogata           |          |
| 5,025,902 | A  | * | 6/1991  | Imai et al.     | 192/43   |
| 5,355,981 | A  |   | 10/1994 | Itoh            |          |
| 5,848,679 | A  | * | 12/1998 | Saiko et al.    | 192/37   |
| 6,257,384 | B1 | * | 7/2001  | Sato et al.     | 192/37   |
| 2006/0076205 | A1 | * | 4/2006 | Muramatsu et al.| 192/45.1 |

FOREIGN PATENT DOCUMENTS

GB    859664 A    1/1961
GB    1157138 A   7/1969

* cited by examiner

*Primary Examiner* — Rodney Bonck
(74) *Attorney, Agent, or Firm* — Jeffrey S. Melcher; Manelli Selter PLLC (57) ABSTRACT

The present invention relates to a method for moment transmission, preferably torque transmission, between a first object (4) and a second object (5) that are separated by a gap (g), the method comprising the arranging in said gap (g) of a force-transmitting device (1) that comprises at least one flexible element (3A, 3B) and a plurality of force-transmitting elements (2) that are not part of the flexible element (3A, 3B) but are arranged at said flexible element (3A, 3B), which force-transmitting elements (2) are arranged to have a maximum cross-sectional dimension ($a_{max}$) that is larger than the gap (g) and another cross-sectional dimension (a) that is smaller than the gap (g), in order by friction by wedge-action to transmit moments between said first object (4) and said second object (5), said elements (2) being arranged to have a design and an attachment at said flexible element (3A, 3B) that without external influence of said device (1) enable transmission of force in two opposite directions. The invention also comprises such a device.

10 Claims, 10 Drawing Sheets

METHOD AND DEVICE FOR TORQUE TRANSMISSION

CROSS-REFERENCE TO RELATED APPLICATIONS

This application is a national stage entry under 35 U.S.C. 371 of International Application No. PCT/SE2007/050763, filed 22 Oct. 2007, designating the United States. This application claims foreign priority under 35 U.S.C. 119 and 365 to Swedish Patent Application No. 0602539-9, filed 28 Nov. 2006.

TECHNICAL FIELD

The present invention relates to a method for moment transmission, preferably torque transmission, between a first object and a second object that are separated by a gap, the method comprising the arranging in said gap of a force-transmitting device that comprises at least one flexible element and a plurality of force-transmitting elements that are preferably not part of the flexible element but are arranged at said flexible element, and the arranging of said force-transmitting elements to have a maximum cross-sectional dimension that is larger than the gap and another cross-sectional dimension that is smaller than the gap, in order by friction by wedge action to transmit a moment between said first object and said second object. The invention also relates to a coupling device for working the method.

PRIOR ART

The present invention (product) relates to equipments, preferably in connection with machines in which a shaft is coupled together with a hub. The hub may, in its turn be formed as and/or associated with a shaft coupling half, a cog wheel, a belt pulley, a pump or turbine wheel or any other element that is to be coupled to a shaft or a similar element. Known constructional elements for the coupling can largely be classified as shape determined, such as a key joint, or friction determined, such as a press joint or a friction joint with a conical sleeve. More specifically, the invention relates to the field of friction joints having essentially cylindrical surfaces for the shaft and the hub.

One type of known friction joints are so called tolerance rings that consist of a strip that is undulated in its tangential direction. The radial extension of the waves of the undulation is larger than the radial gap between the cylindrical surfaces of a shaft and a hub that are to be coupled together. A moment is transmitted by friction from the normal force that arises from the strip when it has been mounted in the gap. The transmitted moment is directly dependent on the axial force that is required when the details are mounted.

It is also known from GB 1,157,138 to use oblique elements directed to transmit a torque in both rotational directions. The device comprises a (steel) strip that is pressed to different thicknesses (in a machine), is punched to a certain shape with recesses and is then bent to give a tangentially corrugated shape. The strip is defined as "endless" and thereby it can be reeled up. Before mounting a suitable length is cut and bent to the appropriate circular shape for a shaft and is hardened. Probably, many problems will arise in connection with this device, among others relating to tolerances of the distance between contact points for force transmitting parts (thicker parts), which probably explains its obviously limited commercial use.

A similar device "strip shape", made of spring steel, is shown in U.S. Pat. No. 3,353,639. It has strongly oblique teeth intended plastically to engage the shaft and hub, respectively. Hence, the principle is based on that the tooth edges should be able to penetrate the counter material, which in many cases is undesired. Among other things, the counter material must be relatively soft, such as aluminium, and/or the teeth must have very sharp and hard edges. A double-sided design will furthermore not work in connection with a shifting or varying moment load, due to the permanent deformations.

From U.S. Pat. No. 4,569,614 it is furthermore known a device that comprises a strip as the main element. The strip has parts that are U-shaped in the tangential direction, which parts, similar to tolerance rings, are larger than the radial gap. These parts can transmit a moment (hereinafter mostly referred to as torque) in two directions by the obliqueness adjusting itself to the direction of the torque. Typically, the obliqueness is achieved by elastic deformation of the U-shaped part, i.e. the part on which the force acts. The contact surfaces against the shaft and the hub are shown to have very small radii of curvature, which is probably necessary in order for the strip to be able to transmit a torque without slippage. The device gives a lower mounting force in the axial direction than a traditional tolerance ring does, but the very thin part in the U-parts must lead to a considerable weakness, resulting in that they are buckled or crushed. In many applications this is a major disadvantage.

Another known device for torque transmission in a single direction only, a so called free-wheel, U.S. Pat. No. 4,809,831, discloses a holder for elements with a section shape like a "peanut shell". The elements are of complex shape with recesses in the side surfaces for secure retaining in central recesses in a "continuous" strip. The elements are arranged to move freely in these recesses and are retained by the creation of an obstruction in the strip in order for the elements not to be able to fall out. The device is relatively complex and thereby expensive to manufacture. Free-wheel elements are moreover normally made in hardened steel to operate against hardened surfaces, which makes them even more expensive.

From U.S. Pat. No. 5,355,981 it is furthermore known a device for a "free-wheel" or more precisely a switch, comprising elements similar to those described in U.S. Pat. No. 4,809,831 but having two concentrical strips that allow for the free-wheel direction to be chosen and switched by a manoeuvring by an external action by the first and the second strip, respectively. This is accordingly a complex device that thereby has considerable disadvantages.

BRIEF ACCOUNT OF THE INVENTION

It is an object of the invention to eliminate, or at least minimise at least one of the above mentioned disadvantages, which is achieved by a method of the present invention and a coupling device for the present invention.

The improvement achieved by the invention relates primarily to an improved ability to transmit a torque; the enabling of larger allowed dimensional variations due to tolerances in the radial gap; the enabling of a lower contact pressure according to Herz, which results in less permanent deformations and less risk that the force-transmitting elements (hereinafter called pin/pins) are crushed or buckled due to the arising forces. According to the invention, pins are positioned in a radial gap "g", preferably between cylindrical surfaces for a shaft and a hub. These pins have at least one radial cross-sectional dimension in the assembled state that is smaller than the gap and another one that is larger than the gap. Hereby, a wedge action may arise. Additional aspects and advantages of the invention are clear from the description below in connection with exemplified embodiments according to the invention.

BRIEF DESCRIPTION OF THE DRAWINGS

In the following, the invention will be described in greater detail with reference to the attached drawing figures of embodiments according to the invention, of which.

DETAILED DESCRIPTION

Figure 1A:
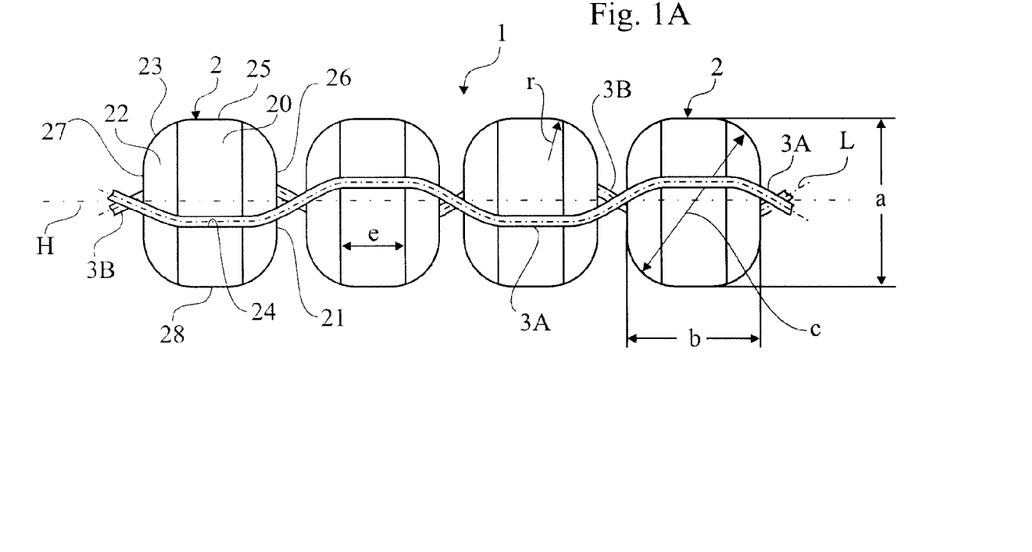
FIGS. 1A, B show a part of a coupling device, in a side view.
Figure 1B:
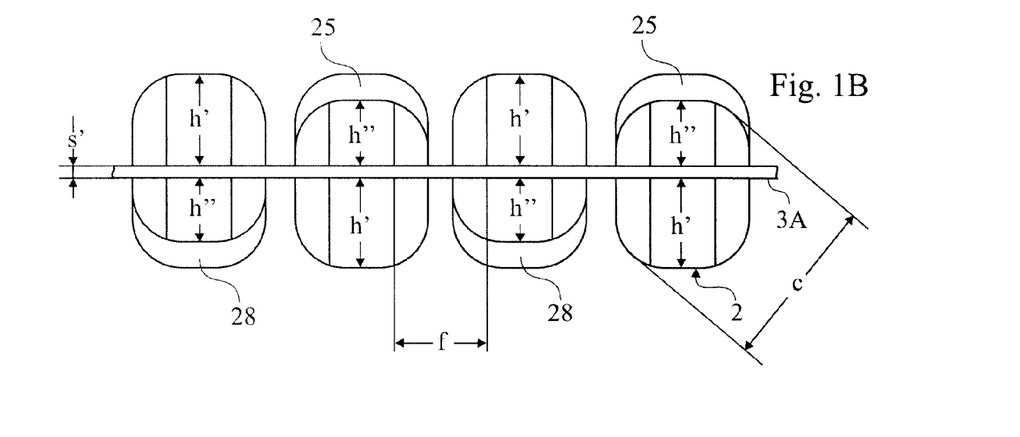

FIGS. 1A and 1B show a first embodiment as side views of a part of a coupling device 1 according to the invention. FIG. 1A shows a contemplated position that arises when the pins 2 in the device 1 are pressed between an upper and a lower contemplated plane, such that these are parallel and uniform, with the purpose of illustrating the shape of two strips 3A, 3B that hold together the pins 2. FIG. 1B shows the device 1 in a non-affected state, in which the strips 3A, 3B are in one and the same plane. Hence, the figures show that the coupling device 1 consists of a number of pins 2 that in cross-section have a certain representative width b, as measured transversely to (i.e. at an angle of about 90°) a vertical dimension a that will be explained in greater detail below. In this embodiment, the dimension a is shown to be larger than the width b and smaller than the maximal cross-sectional dimension c of the pin. The pins 2 are united/attached by a flexible element, here in the form of two strips 3A, 3B, at either end 20A, 20B (FIG. 2) of the respective pin 2. The strip 3A is flexible and has certain elasticity and its objective is to be able to affect the pins 2 elastically to be positioned as desired in the radial extension, i.e. a direction that is essentially perpendicular in relation to the extension L of the strip, and also to fix each pin 2 in a certain position in relation to other pins 2 at the strip 3A. The embodiment in FIGS. 1A, 1B shows a device with "neutrally positioned" pins 2, in which each pin 2 is intended to take part in torque transmission in two opposite directions.

The pins 2 are suitably riveted together by pressing of the ends 20A, 20B of the pins to the strip 3A, 3B, to form them into a kind of mat. The flexible element is preferably formed as a strip, which means that the mat becomes flexible across the longitudinal direction of the pins and stiff along the same. Alternatively, the joining together can take place by other methods such as welding, gluing etc.

Figure 2:
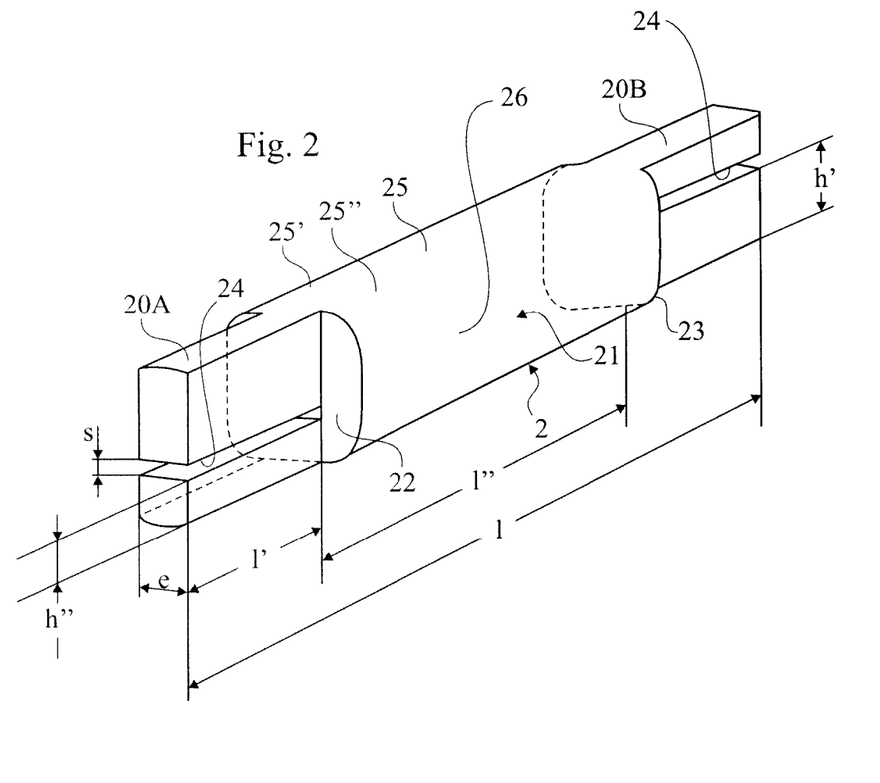
FIG. 2 shows a view in perspective as seen obliquely from above, of a force-transmitting element/pin.
Figure 6A:
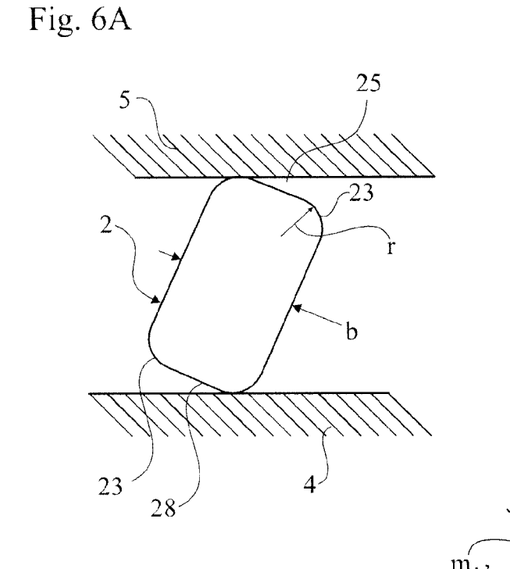
Figure 8:
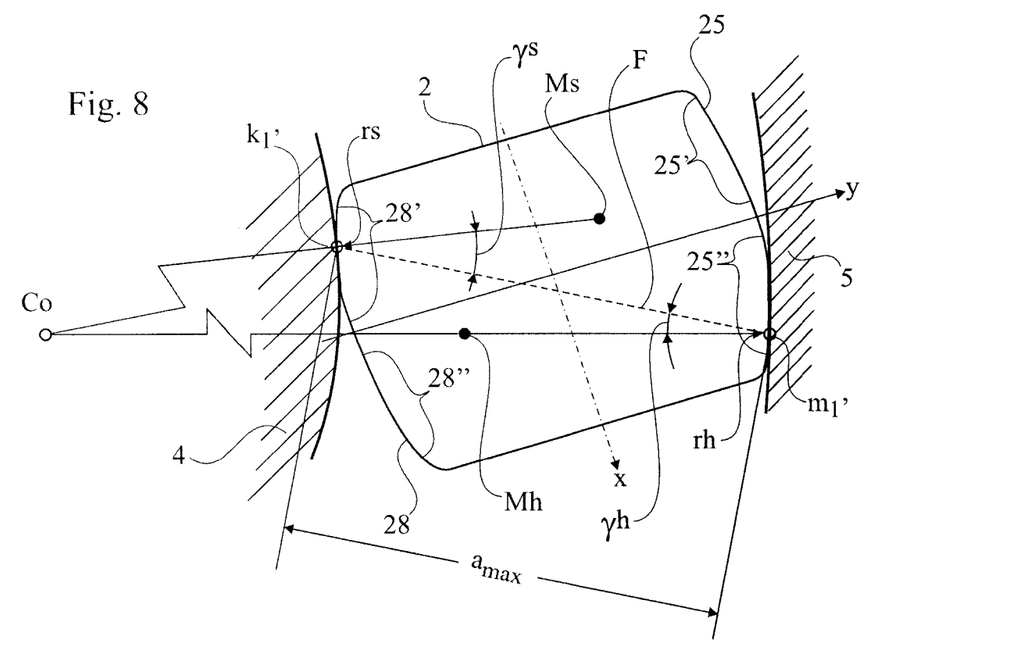

It is clear from FIGS. 2, 6A and 8 that each pin 2 comprises a central solid portion 21, that has four sides 25, 26, 27, 28, of which two are essentially opposing contact surfaces 25 and 28, that comprise bent opposing contact zones 25', 28" and 25", 28' respectively (FIG. 8). The contact zones 25', 25", 28', 28" are shaped to have a curvature radius r (FIG. 1) the size of which is essential to the invention.

Figure 5:
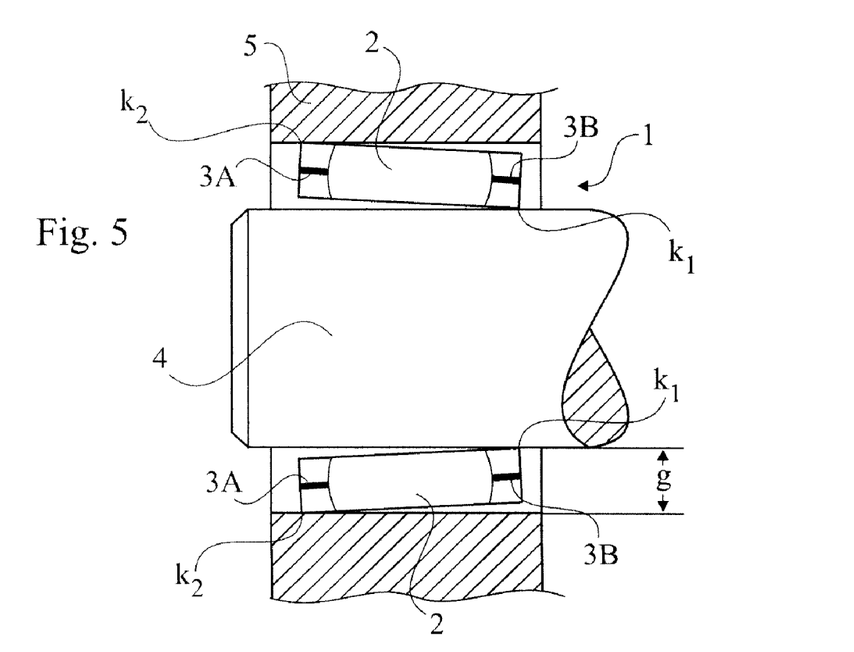
FIG. 5 shows a cross-section in a side view, of a part of a coupling device mounted between a shaft and a hub, FIGS. 6A, B schematically show side views that illustrate some principles of the function of a pin, FIG. 7 schematically shows a principle side view of an alternative embodiment of a pin, FIG. 8 schematically elucidates the functioning principles of a pin according to FIG. 6B, FIG. 9 schematically shows a side view of yet an alternative of a pin, FIGS. 10A, B show an alternative configuration of a coupling device, in a side view, FIG. 11 schematically shows an alternative coupling device in a cross-sectional side view.

The contact zones hold the surfaces that are intended to be active by friction/clamping action in order to transmit a torque, e.g. from a shaft 4 to a hub 5 (FIG. 5). The pins 2, that are shown for example in FIGS. 2 and 8, are double-acting and have two pairs of opposing contact zones 25", 28' and 25', 28", which interact in pairs. One pair is intended to transmit a torque in one direction and the other pair in the opposite direction. In case of the transmission of a torque there is line contact between the pin 2 and the shaft 4 and the hub 5, respectively, at the two opposing contact points $k_1$, $m_1$ (FIG. 8) that are situated within the area of said contact zones 25', 25", 28', 28" that form parts of, or in the extreme case the whole, contact sides 25, 28. To describe the height dimension of a pin 2, there is made use of a cross-sectional dimension that has the minimum value a, which is the perpendicular distance between two parallel tangents for two opposing contact points denoted $k_1$, $m_1$, lying within said contact zones 25", 28' and 25', 28", respectively. Each side 25-28 is connected with the adjacent side 25-26, etc., by a bent surface that forms a kind of corner zone 23, which corner zone preferably does not comprise said contact zone to any extent, but suitably has a configuration that is determined by production technical aspects. It is realised that a maximum height dimension $a_{max}$ (FIG. 8) can be less than the maximum cross-sectional dimension c of a pin (FIG. 1A), and that the height dimensions for a contact zone lie in a range a to $a_{max}$.

Each pin 2 has a longitudinal extension l (FIG. 2) that is considerably larger than the vertical dimension of the pin, preferably l>10 a, whereby each pin 2 gets a long and narrow configuration. A major advantage of this long and narrow configuration is that a considerable saving in material is achieved without lowering the torque transmitting capacity of the device. On either side of the central portion 21 are the ends 20A, 20B of the pin, in the following denoted positioning portions 20A, 20B, that have a smaller longitudinal extension l' than the longitudinal extension l" of the central portion 21. A long and narrow recess is arranged in the form of a groove (a slot) 24 in the respective positioning portion 20A and intended to accommodate and fix the pin 2 at a first 3A and a second 3B strip, respectively. As is clear from the figure (see also FIG. 1B), the grooves 24 are vertically displaced such that the grooves 24 at one end are positioned above the "central plane" of the pin and at the other end they are positioned below the same, such that the distance h" from one side 25, 28, to the groove 24 gets considerably shorter than the distance h' from the other side, i.e. h'>h" and h'+h"+s=a. The opening s in the groove 24 is adapted to the thickness s' of the strip 3A, 3B, i.e. it is large enough to enable the mounting of the pin 2 on the strip and subsequent fixing at the strip. Suitably, steel strips 3A, 3B are used that have a thickness of about 0.05-0.5 mm, made of a spring steel of suitable elasticity. The opening s of the groove 24 is given a suitable tolerance to be about 0.01-0.1 mm larger than the than the thickness of the strip.

With the purpose of giving the free part f (FIG. 1B) of the strip 3A, 3B between two adjacent pins 2 the possibility to flex with a good margin, there are recesses in the ends of each pin 2, on either side of the positioning portions 20A, 20B, such that shoulders 22 are formed between the transition from the positioning portions 20A, 20B to the central portion 21, whereby the thickness e of the positioning portions 20A, 20B gets considerably smaller than the width b of the pin 2. A larger free length f also results in a greater elasticity and a reduced contact force, which in turn leads to a smaller axial force in connection with assembling and disassembling. The greater elasticity also leads to the allowance of larger variations in the radial play without the strips 3A, 3B getting overloaded. At the same elasticity the shoulders 22 result in that a large number of pins can be used.

Figure 3:
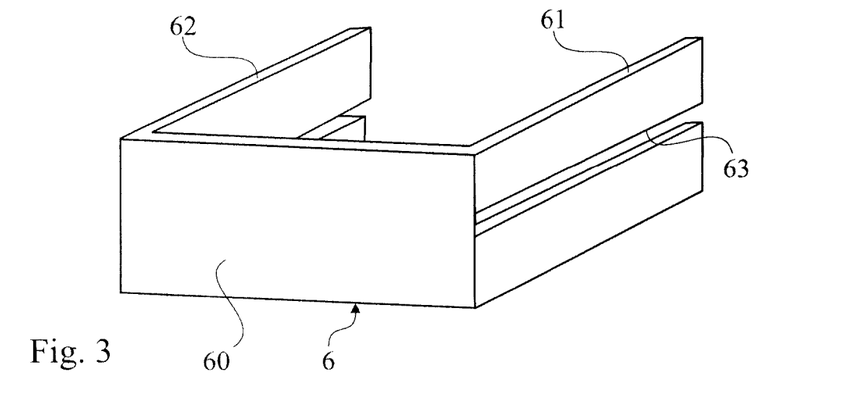
FIG. 3 shows a view in perspective as seen obliquely from above, of a locking device adapted to be used in connection with the invention when this is used in circular gaps.
Figure 4:
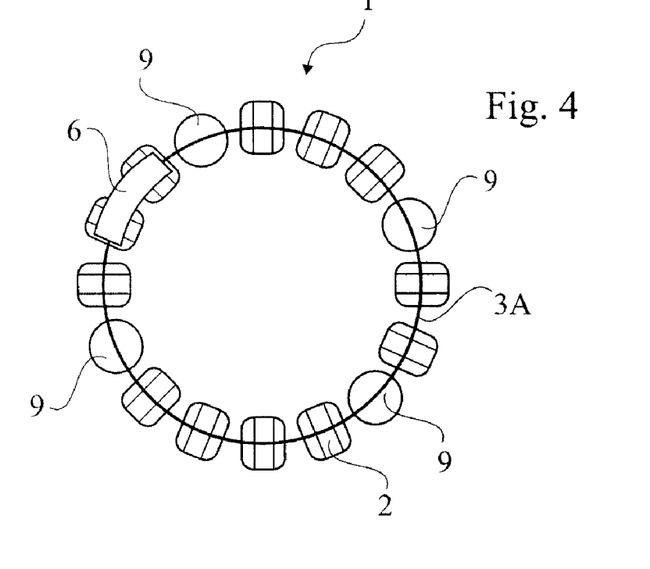
FIG. 4 schematically shows a side view of coupling device in a combined circular shape.

FIG. 3 shows, in a perspective view, a locking device intended to be used to bend a coupling device 1 and intraconnect it to form an approximately circular coupling device 1 (FIG. 4). The locking device 6 consists of a central straight or bent plate-shaped part 60 from which a first 61 and a second 62 locking leg extend perpendicularly, which locking legs 61, 62 are provided with a groove 63 adapted to receive one of the two strips 3A, 3B. By the extension of the central plate-shaped part 60 being adequately large including the reduced width e (FIG. 2), two positioning portions of two neighbouring pins 2 can with a variation of ±a half spacing be accommodated between the locking legs 61, 62, whereby the coupling device 1 is fixed in a circular shape.

Figure 11:
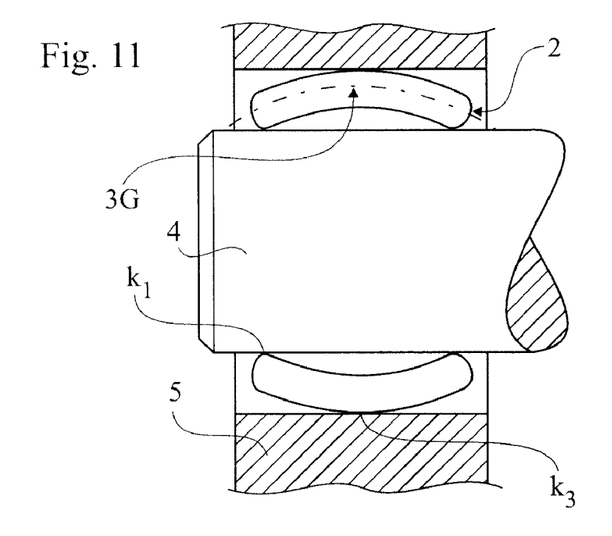

It is furthermore shown in FIG. 4 that a few spacers 9 advantageously can be used, which are positioned at essentially regular distances among the pins 2. In FIG. 4 there is, as an example, used four spacers 9. The spacers 9 are made e.g. with a completely circular cylindrical outer periphery and are suitably tube-shaped with an open or closed section in order to be radially flexible. The function of the spacers 9 is to assist in the centring of a hub 5 in relation to a shaft 4, between which a coupling device 1 according to the invention is arranged. Hence, also when the pins 2 are "inactive", the spacers 9 maintain a desired uniform gap g between the hub 5 and the shaft 4. The spacing between the spacers 9 in a mat is chosen such that there are at least three spacers for a given shaft diameter d. Generally, the cylindrical shape need not be used but can be replaced with any shape that, with adequate accuracy, is able to fill the gap g and centre the hub at the shaft. In a preferred embodiment, the centring is made e.g. by pins 2 that are longitudinally bent 3G (FIG. 11).

FIG. 5 shows in cross-section a coupling device 1 according to FIG. 4, positioned to give permanent contact between a shaft 4 and a hub 5 in the gap g them between. As is clear from FIG. 5, the elasticity in the strips 3A, 3B will affect the pins 2 to alternately abut with one end (an outer contact point k2) against the hub 5 and with the other end (inner contact point $k_1$) against the shaft 4. Hereby, it is ensured that a movement between the shaft 4 and the hub 5 always will affect the pins 2 in the coupling device 1 in order to bring them into an active position for force transmission.

FIG. 6B-8 illustrate that the torque transmission, including some axial and radial forces, take place by the specially shaped pins 2 according to the invention. The shape of the pins 2 is such that a wedge action by friction will transmit the torque, from a first part 4 to a second part 5.

According to one aspect of the invention, the curvature radii r of a pin 2 at the contact zones 25', 25" and 28', 28", respectively, in FIG. 8 denoted rs and rh, respectively, where s denotes "shaft" and h denotes "hub", are suitably larger than half the smallest cross-sectional dimension of the pin a, i.e. rs>½·a and rh>½·a, respectively. In order geometrically to be able to realise this, in connection with large variations in the radial play "X" (FIG. 6B), a representative value of the smallest cross-sectional dimension b of the pin (this is suitably also true for a dimension b' (FIG. 7) measured in a direction that is approximately tangential when the pin is mounted between the shaft and the hub) is larger than a fourth of the dimension a or b>¼·a and preferably b>⅓·a and more preferred b>½·a. This size of b is also necessary in order to prevent that the pin 2 is crushed when loaded, thereby resulting in serious errors and failure to operate. The dimension b also determines the possible variations of the gap and its tolerance X. The variation X is considerable in practice as it does not only comprise production tolerances for the shaft 4, hub 5 and pins 2, but also elastic and plastic deformations in these parts resulting from load. As the device 1 gives a uniform distribution of normal forces, the wall thickness of the hub and the shaft, particularly a hollow shaft, can be made small which results in considerable cost savings. Of course, the smaller wall thickness will increase the elastic deformations and thereby the variation of X.

FIG. 8 shows an embodiment in which $a_{max} \approx c$, i.e. in which the contact zones 25', 25", 28', 28" reach almost the entire way out to the outermost point of the corner zone and in which the entire contact sides 25, 28 are used as contact zones 25', 25" and 28', 28", respectively, which means that there need not be a gap between the contact zones, i.e. 25' and 25" meet each other at the middle of the contact side 25. As the radial play X is relatively small, the dimension a can generally be said to be equal with the gap g when the invention is used between a hub 5 and a shaft 4 having a given diameter d.

Figure 6B:
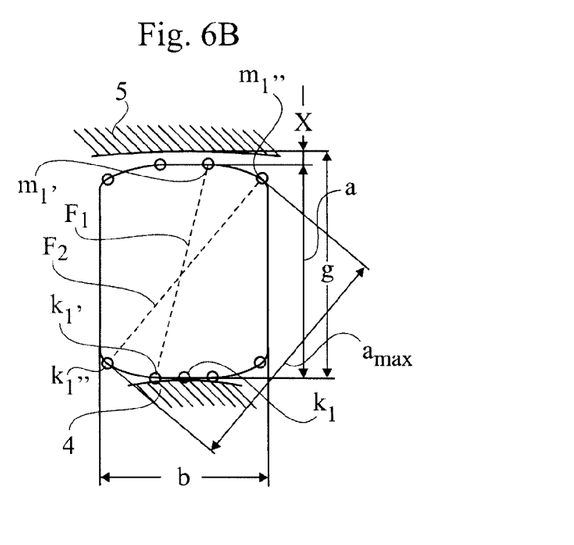
Figure 7:
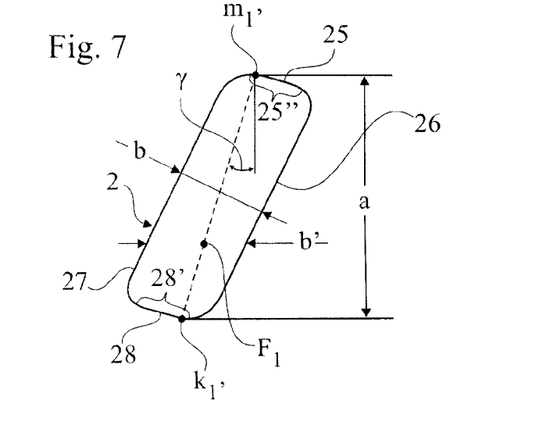

For a "neutrally positioned/double-acting" pin 2, the dimension a can be measured directly at the pin 2 (FIG. 6B) which is not the case in connection with opposed pins 2 of specific shape (FIG. 7). The points $k_1'$, $m_1'$; $k_1''$, $m_1''$ that in FIG. 6 are marked with rings are contact points at the smallest and the largest radial play X, respectively. In connection with a torque load with the smallest play, the resulting forces of friction and of the normal forces act along the dotted line $F_1$ between $k_1'$ and $m_1'$. At the largest play, a corresponding line $F_2$ results between the outer points $k_1''$, $m_1''$. At the opposite direction of the torque, all points shift over to the other sides. The area between the central points at the top and at the bottom is normally not used. The smallest radial play X is suitably determined in consideration of simple assembly of the device 1 and its pins between the shaft 4 and the hub 5 and is about 0.01% of the shaft diameter or about 0.2% of "a". The largest play X is determined by the dimension b and the operating area of the flexible element, and for practical reasons it is of the magnitude of 5% of "a". In an alternative embodiment with an articulated bent element, the radial play X can however be of the magnitude of 25% of 1 (FIGS. 18, 19).

Pins 2, which are positioned to be opposing (FIGS. 10A, 10B), may have a strongly reduced sectional shape (FIG. 7).

In principle, the cross-sectional shape in FIG. 7 is taken as a part of the shape in FIG. 6B, namely containing only one pair of opposing contact zones 25", 28", as such a reduced pin 2 is intended to act only in a single direction whereas another similar one, but opposing, pin acts in the opposite direction. FIG. 7 also shows the dotted line $F_1$ for the line of action of the forces at the smallest radial play. The measure of the dimension a can be identified, but the measuring requires knowledge of an angle γ. With a known or estimated value of a friction coefficient $\mu_d$, normal value 0.05-0.15, the angle γ (friction angle) is determined as $γ=\arctan(\mu_d)$. This practical method gives an accuracy for the measuring of a, which is considerably better than ½ percent. More precisely, the dimension a is the smallest dimension that has an angle γ that is larger than zero and at the same time smaller than a certain maximum value. Between parallel or concentric surfaces, a wedge action with longitudinal or tangential force transmission is namely based on that the contact points $k_1$ and $m_1$ are not positioned directly opposite each other, but that a connection line F them between forms an angle γ against a normal to parallel tangents in these points. Analogous, the largest dimension $a_{max}$ is the largest dimension that has an angle γ larger than zero and smaller than a certain maximal value. For some cross-sectional shapes it can happen that the friction angle for a and $a_{max}$ becomes unrealistically large. According to the invention, the maximum value of the friction angle is hence limited to about 12° for "natural" untreated contact zones and 24° for those prepared to have a large friction coefficient, see also below. The contact zones are hence the areas where the angle γ is larger than zero and less than a certain value, irrespective of if the entire areas are used in a certain application or not.

The curvature radii rs and rh in the contact zones in the contact sides 28 and 25, respectively, (FIG. 8), determine the transmittable torque by the size of the contact stress according to Herz, together with the values of the friction coefficient $\mu_d$. FIG. 8 shows the basic geometry with contact points $k_1$ and $m_1$, respectively, against the shaft 4 and the hub 5. At these contact points, the directions of the curvature radii rs and rh with centres at Ms and Mh, respectively, coincide with the radii of the shaft and the hub, respectively, from a common shaft centre Co. A line F (dotted) between the contact points $k_1$ and $m_1$, forms the angles γs and γh against the radii rs and rh, respectively. These angles are friction angles and are determined as before. The resulting forces of friction and normal forces will thereby act along the line F.

The complete geometrical relations in a system of coordinates x, y (FIG. 8), together with equilibrium conditions for the forces, can be formulated for a given shape of the contact zones. In connection with gaps of different sizes and thereby different radial plays X=g-, different parts of the contact zones will be in action. The shape of the contact zones 25', 25", 28', 28", i.e. their curvature radii rs, rh, will determine a friction coefficient (friction angle) that is used to dimension the construction. The radii rs and rh are positive for convex contact surfaces of the pins. For a torque transmission without slippage, the dimensioned friction coefficient must be smaller than the real one in question, by a certain margin; the slippage margin.

According to the invention, the shapes of the contact surfaces are determined from criteria with basis in the friction angles γs and γh. These angles are primarily chosen to be constant and equal for all values of the radial play X. Secondarily, they are chosen to make the hub 5 self-centering in relation to the shaft 4, increasing with the play and with a variation about a mean value of preferably ±30%. Since the force equilibrium is determined by curvature radii, the play and the friction coefficient, normal forces result at different plays from an eccentricity between hub/shaft, which forces strive to eliminate the eccentricity. In both these cases, the geometrical shape is achieved by application of usual mathematical calculation methods.

When the friction angles are adapted to the actual play, according to the criteria above, it ensured that the slipping margin is the same at all values in question for the play. A consequence is that the slipping margin need not be chosen to be unduly large, which in turn leads to the possibility without risk to allow larger torques. A determined slippage margin will also lead to that neither the axial force in connection with disassembly (withdrawal) gets unduly high. In connection with geometrical shapes that fulfil the criteria above, is can be shown that if rs/a+rh/a<1 then the play X must be negative, i.e. that the main dimension a of the element must be larger than the gap, as is stated for prior art mentioned in the section with that name.

Figure 12:
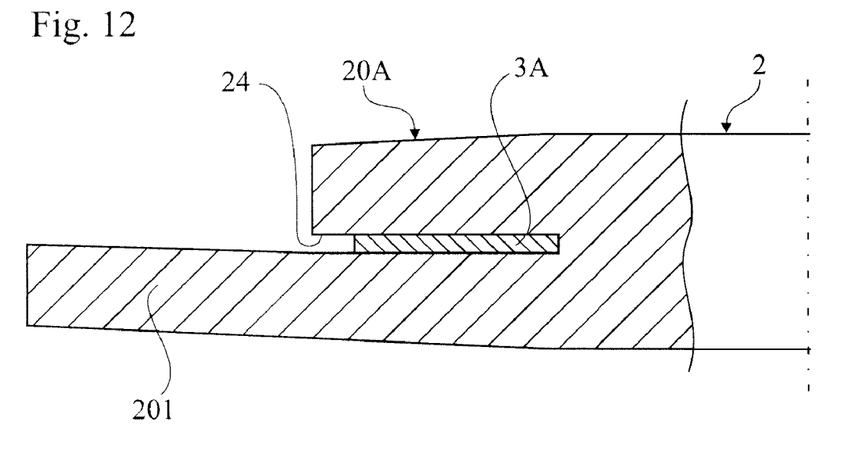
FIG. 12 shows, in cross-section, a part of a pin with an assembled strip.

The pressing together 3A, 3B is advantageously made to be somewhat inclined (FIG. 12) and is larger at the outermost ends of the pins. A bevel is created thereby, which facilitates the mounting of the hub to the shaft. The inclination will also lead to the possibility to considerably decrease the contact pressure according to Herz, which has its maximum value at the ends of the pins. In a more refined embodiment, the inclination is performed to achieve a so called modified line contact. The cross-sectional dimension a is then reduced by a few percent at the outermost active portion of a pin 2, in order to be completely without reduction after an axial distance of about 2 times the dimension a.

In one embodiment (not shown), the contact sides of the pins against the shaft are made concave; i.e. the curvature radii rs become negative. The geometrical conditions will then lead to that rh should be chosen to be larger. Consequently, for contact points at the shaft as well as the hub, a considerably better and close contact is achieved which in turn increases the transmittable torque by the magnitude of a factor 3 under conditions that are otherwise the same.

The elasticity of the strip 3A, 3B and thereby of the device 1 is large enough to enable that it is "endlessly" reeled up to form a roll and to enable it to easily be manually formed after the shape of a shaft 4. The minimum surface moment of inertia "I" for bending across the longitudinal direction L of the device in respect of the flexible elements, strips, at both sides of the device 1 should hence fulfil the requirement $I<(0.1·a)^4$.

Figure 10A:
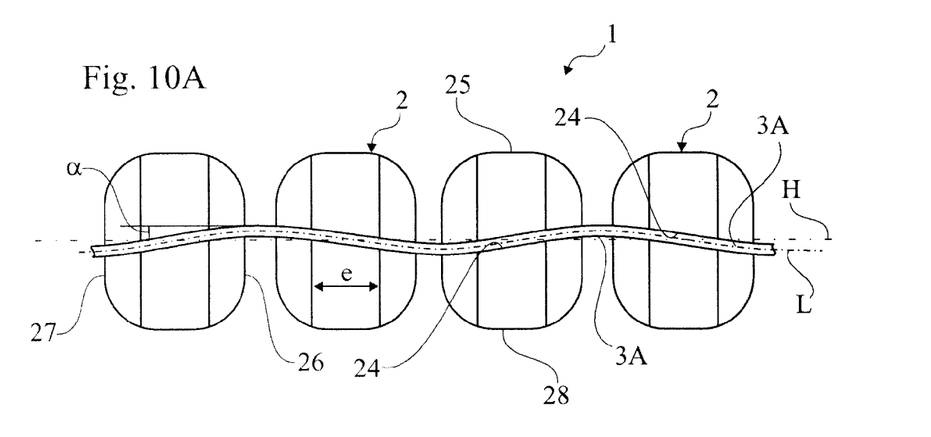
Figure 10B:
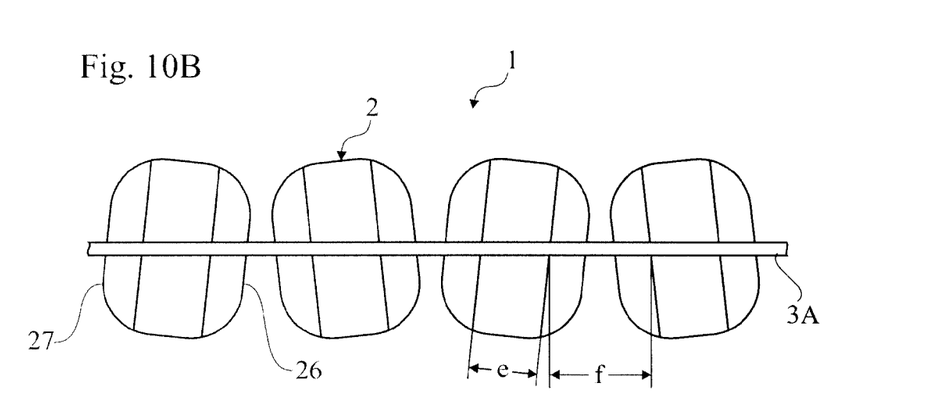

As is also described below, the grooves 24 are preferably not symmetrically and centrally positioned at the ends of the pins 2. An initial prestressing of the pins 4 against the shaft 4 and hub 5, respectively, takes place by a non-symmetrical alternating positioning on every second pin. When the device 1 is assembled, all pins have a permanent slight bearing pressure against the shaft 4 and the hub 5, respectively. When double and opposing pins 2 are used with one pin intended for the driving in each direction of rotation, the grooves 24 are positioned obliquely at an angle α (FIGS. 10A and B).

When one and the same pin 2 is intended for the driving in both directions of rotation, with neutrally positioned pins, the grooves 24 are suitably alternately displaced, every second groove in a parallel direction outwards and every second groove in a parallel direction inwards, as seen in the radial direction in the assembled state between the shaft and the hub 5 (see FIG. 1). When the device 1 is assembled (FIG. 5), each pin 2 is in contact $k_1$, $k_2$ with the shaft 4 and the hub 5 at or close to its end points. As an alternative to the parallel displacement, the pins 2 can be formed with a slight curvature/bend 3G in their longitudinal direction (FIG. 11), such that at least one contact point $k_1$ is achieved at the shaft 4 and one $k_3$ is ensured at the hub 5. In connection with larger values of the axial length of the pins, the simple curve in FIG. 11 is replaced by several curves shaped to correspond to a sine curve. Hereby, more contact points are achieved. In order for opposed pins with reduced cross-section not to be able to tip over by turning about their own axial axis, a limitation is required that can be effected by the side strips 3A, 3B and/or by the pins having surfaces shaped therefore and which in their simplest form may be symmetrical as is the case for neutrally positioned pins according to FIG. 1.

In order to facilitate (FIG. 12) for a narrow strip 3A, 3B to be inserted into the groove 24, the material on one side of the groove 24 is suitably made longer than necessary in the axial direction, such that it forms a protruding lower portion 201 intended to act as a assembly support. The strip 3A, 3B may then slide against the protruding portion 201 and into the intended position. When the strip is in its intended position, the protruding portion 201 can be removed. Advantageously, the extension l' of the groove is longer than the width of the flexible element, whereby the latter will be locked and restrained by the protruding material.

The axial length l" or l of the force-transmitting portion 21 is advantageously made larger than 10 a. Hereby, a soft transmission of the torque between the shaft 4 and hub 5 results, thus fulfilling the requirements that within German technology is referred to as "Kraftfluss". The action is achieved by elastic and plastic (=permanent) changes in shape due to the small cross-sectional dimensions of the pins in relation to the shaft. The large length l" of the force-transmitting portion 21 also ensures a safer transition from initial load to torque transmission. A large length ratio l/a compensates variations in radial play from geometrical flaws such as barrel shape or conicity. The length l" of the force-transmitting portion 21 can advantageously be distributed over several shorter pins, the total axial length of which are to fulfill the criteria above. The total axial extension of the force-transmitting elements can be larger than 8-100 a, and preferably larger than 10-40 a. The utilisation of large, lenient contact surfaces, i.e. the combination of a relatively large length l in the magnitude of ½ to 1½ times the shaft diameter d, relatively many elements 2 and relatively large curvature radius r, results in that the device 1 can be used also for relatively soft construction materials, i.e. unhardened steel (HB below 450), bronze, aluminium, plastics, etc.

The friction coefficient μ is a main parameter for the invention. It should be as large as possible and have a safe value the size of which is only limitedly affected by surrounding factors such as lubrication. Advantageously, the pins are given a rough surface that is achieved by chemical or mechanical influence (sand-blasting) or by a suitable coating such as carborundum or "Nylock Torque Patch" (Nylock Corporation, USA). When the friction coefficient and thereby the friction angle has increased in this way, the contact zones and the curvature radiuses of the pins advantageously change according to the criteria above, in order to achieve the full benefit.

Figure 9:
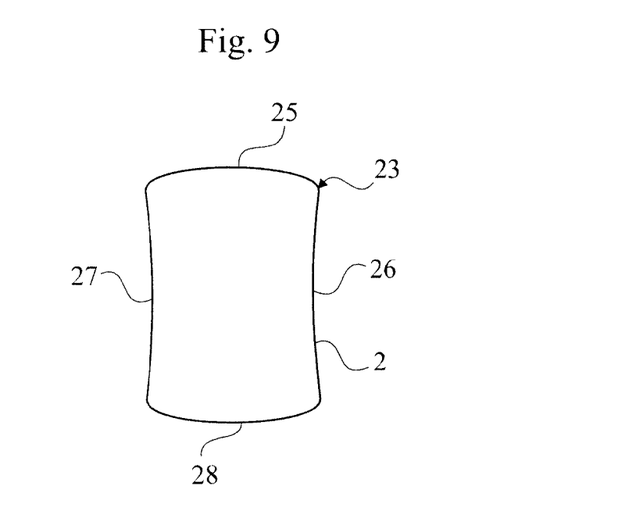

It is shown in FIG. 9 that the pin can be made to have slightly concave side surfaces 26, 27, which in some cases can be advantageous in order to achieve a good positioning (e.g. in connection with manufacturing) of the pins, since it is thereby possible to ensure that the outer portions at the respective corner zones 23 can form stops in a fixture e.g.

FIGS. 10A and 10B clarify that the groove 24 can be arranged to vary within the scope of the invention. FIGS. 1A and 1B show an embodiment with "neutrally positioned pins" 2, in which the grooves 24 are positioned in a horizontal plane H (as seen in respect of the longitudinal extension of the coupling device 1 in a planar state) and at a displacement in relation to such a horizontal plane H, such that the groove 24 at one side of the coupling device 1 ends up closer to the upper surface 25 of the pin 2, while at the same side of the neighbouring pin 2 the groove 24 ends up closer to the lower surface 28. In FIGS. 10A and 10B on the other hand, an embodiment is shown with "opposed pins" 2, whereby the groove 24 can be obliquely arranged at an angle α in relation to said horizontal plane H and advantageously then such that it at one and the same side of the device 1 is downward inclined at the end of a first pin 2 and upward inclined at a neighbouring, second pin 2. In FIG. 10B, the device 1 is shown in an unaffected state in which the elasticity of the strips 3A, 3B makes them lie in one and the same plane, while FIG. 10A shows an effected state in which the pins have been forced to take positions with parallel side surfaces 26, 27, whereby the strips 3A, 3B are bent. The groove 24 is thereby suitably given the same inclination α, with an extension in the same plane, at each end 20A, 20B of each pin 2. In this "opposed embodiment", only every second pin 2 will participate in the transmission of force in the respective direction. It is also realized that the groove 24 can be centrally arranged in height and hence at the same level at both ends and extending in the horizontal plane H. According to the latter embodiment, the strips 3A, 3B are suitably arranged to have some prestressing (e.g. by bending), such that the elements position themselves as desired, e.g. in accordance with that described above.

Figure 13:
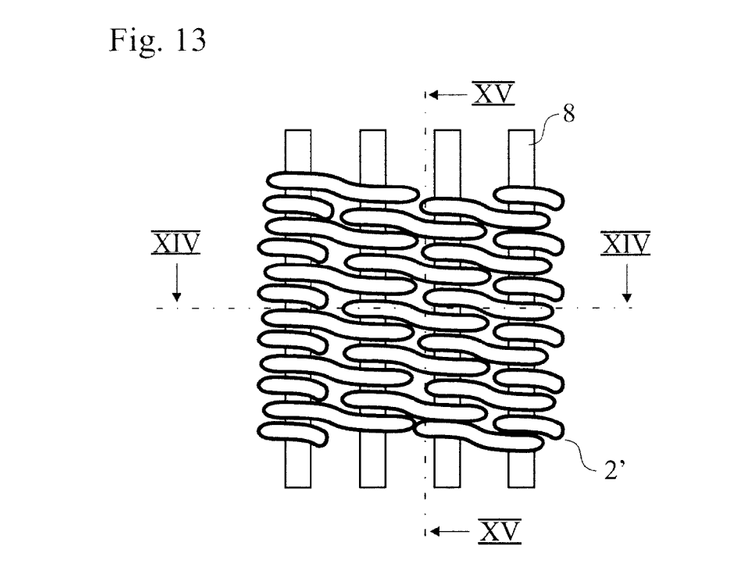
FIG. 13 shows an alternative with a woven mat.
Figure 14:
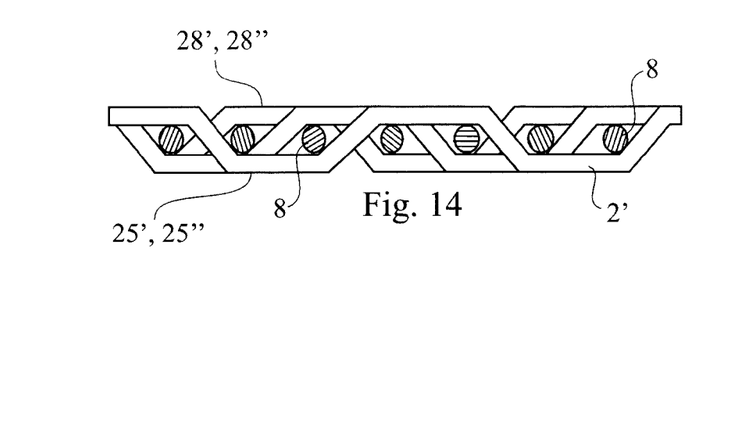
FIG. 14 shows a cross-section along line XIV-XIV in FIG. 13.
Figure 15:
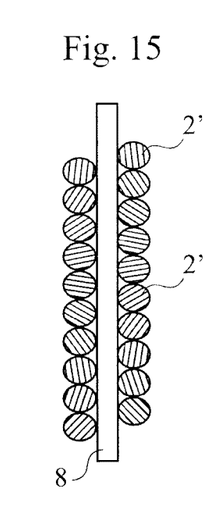
FIG. 15 shows a cross-section along line XIV-XIV in FIG. 13.

FIGS. 13-15 show an alternative embodiment according to the invention, which e.g. is suitable for simpler constructions and makes use of a woven mat 2', 8 or a woven net. A large number of weaving patterns exist, of which the so called "Twilled Dutch Weave" may be particularly suitable and is shown in FIGS. 13-15. The specific property of a moment-transmitting woven mat is that the "thread" 2 in the moment-transmitting direction is of non-circular cross-section. The dimension of the thread can be very small (<1 mm). In FIG. 14, the contact zones 25', 25" and the opposed ones 28', 28", respectively, at 2', have for the sake of simplicity been drawn to be straight. They are of course however slightly curved such that they, together with the inclined portions of 2', will give an initial bearing pressure according to the same principle as is shown in FIG. 11. The woven mat can be used as it is and be rolled about the shaft. It may also form "raw material" for the production of bushings by a process similar to the deep drawing/pressing of cans from planar sheets.

Figure 16:
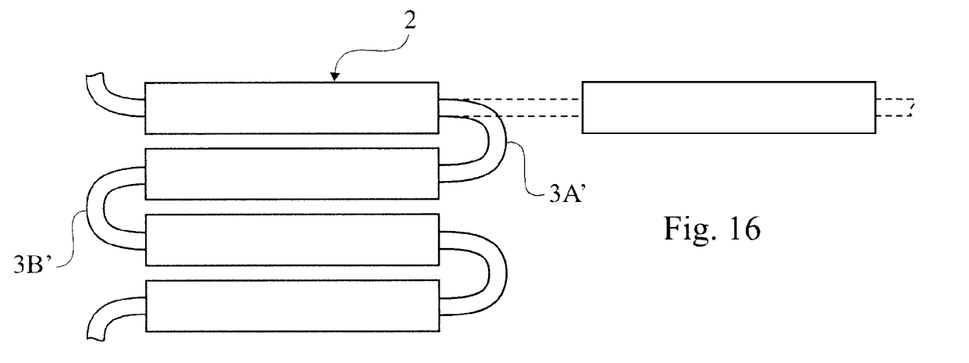
FIG. 16 shows a view of an alternative with pins and flexible element integrated.

FIG. 16 shows, as seen from above, an alternative embodiment of a device 1 according to the invention, in which flexible elements 3A', 3B' that are integral with the pins 2 are used for the holding together (it should be here be noted that for the interpretation according to the claims of this patent application, the term holding together should be given a wide interpretation to comprise also a device in which the parts are integrated) of the pins 2. A device according to this embodiment is accordingly made in such a way that the same starting material is used to produce the pins 2 as well as the "strips" 3A', 3B', whereby the material that is used to act as a strip 3A', 3B' is given a considerably smaller thickness of material than the pins 2, with the purpose of allowing adequate flexibility/elasticity.

Figure 17:
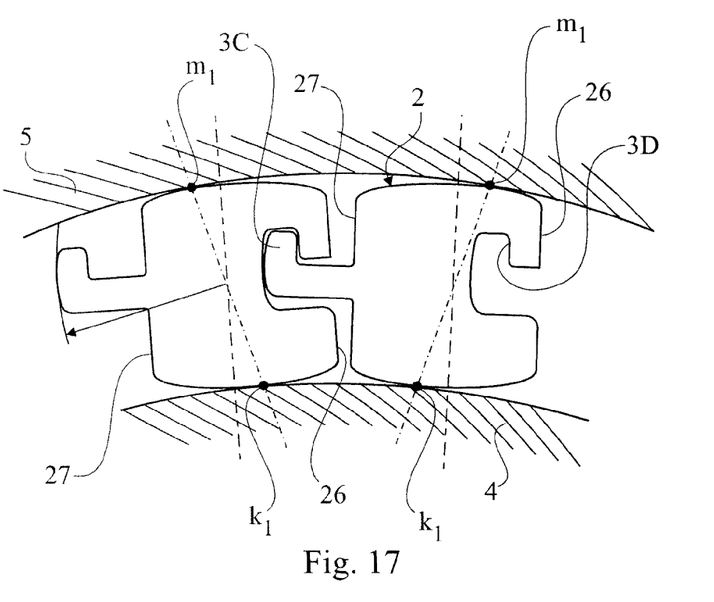
FIG. 17 shows a cross-section of pins that are held together by the geometrical shape of the pins, FIGS. 18A, B show end views of pins intended for a radial gap with large variations, FIGS. 19A, B show side views of pins according to FIG. 18A mounted between the shaft and the hub.

FIG. 17 shows a side view over another alternative embodiment, which shows that it is possible to use the principles according to the invention also without a continuous flexible element, in order to achieve a device 1 according to the invention. It is clear from this figure that a flexible element 3C, 3D, that gives the holding together of the pins 2, is instead formed by a male element 3C arranged at one side 27 of the pin 2 and a female element 3D, respectively arranged at the other side 26 of the pin, such that a long mat of pins 2 with flexible elements 3C, 3B them between can be formed.

Figure 18A:
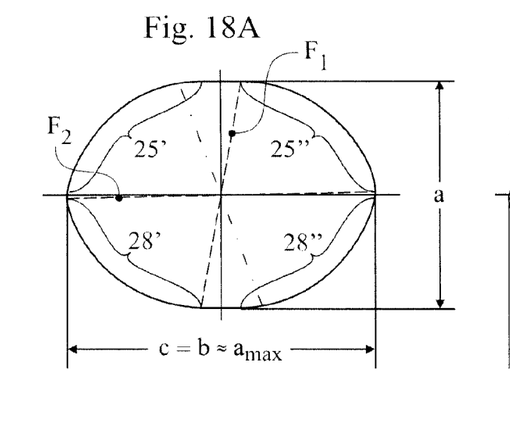
Figure 18B:
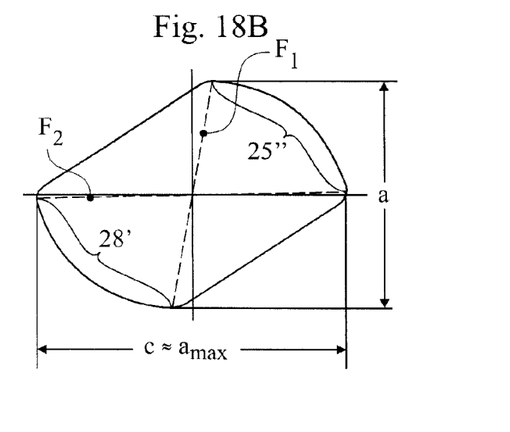
Figure 19A:
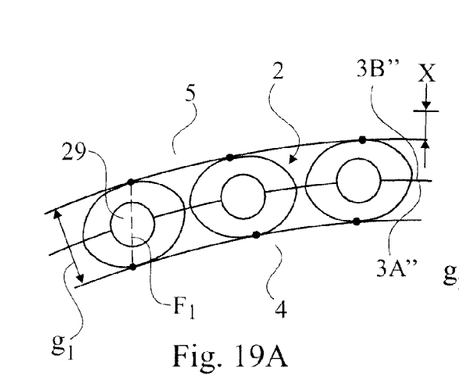
Figure 19B:
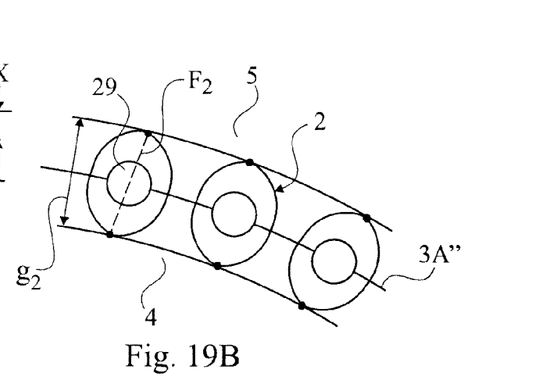
Figure 20:
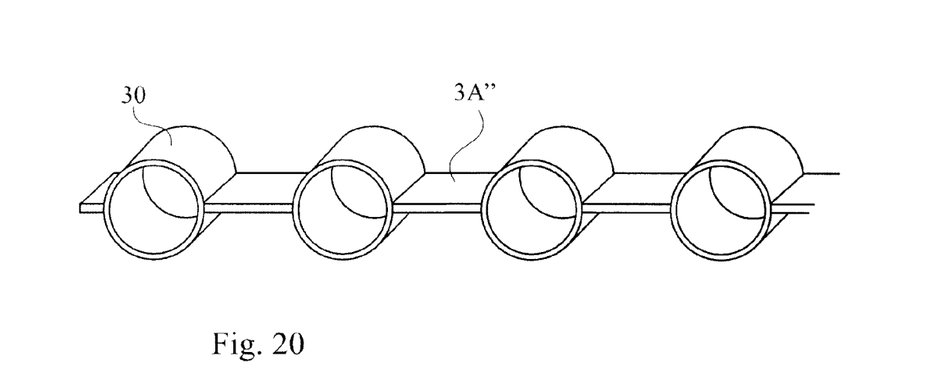
FIG. 20 shows in perspective from above a view of an alternative flexible element for an embodiment according to FIG. 19.

FIGS. 18A, B show a shape of pins 2 intended for extremely large radial plays X. The contact zones comprise practically the entire cross-section or between lines $F_1$ and $F_2$ (25", 28") and the corresponding for the opposed direction of rotation (25', 28"). The width b can be larger than the dimension a. The width b and the dimension $a_{max}$, can be identical and even coinciding with the maximum dimension c of the pin. In case of a reduced sectional shape (FIG. 18B), which is possible in connection with opposed pins, the dimension b is a dimension that is chosen to be representative for the cross-sectional shape in question. FIGS. 19A, B illustrate pins 2 according to FIG. 18A and the principles in connection with use thereof, showing that they are intended for extremely large plays $X=g_2-g_1$, and their different angular positions $F_1$ and $F_2$, respectively, at the minimum and maximum gap, $g_1$ and $g_2$, respectively. In this case, the friction angles are equal for the maximum and the minimum play. When the position of a pin adapts itself to the gap, a rotational angle of almost 90° degrees may be necessary. This can advantageously be achieved by pins 2 that are provided with a recess with a surface of rotation in the form of a circular peg 29 (or a circular groove or the corresponding), in order for the holding together with a articulate/bent element 3A", 3B", here in the form of a strip with integral sleeves 30 adapted to the pegs 29 (FIG. 20), or in the form of double strips (not shown) wrapped together about the pegs 29 of the pins, or in the form of threads twisted in pairs (not shown). A required initial bearing against the shaft and the hub can be achieved by slightly bent pins according to the above, and/or a displaced positioning of the pegs 29.

The invention can be varied in its widest sense within the idea that forms the basis of the invention. Instead of the alternating positioning one by one in the tangential direction, the pins may hence be alternately positioned in groups of two, three, four and so on, pins in each group. It is also realised that alternative elements (instead of strip shaped) can be used to achieve a desired positioning of the pins 2, e.g. instead of strips, a wire of suitable flexibility/elasticity or a plurality of wires, in arrangements diagonally or endlessly as a sine curve e.g. made in spring steel, or some other suitable elastic metal/alloy, suitable polymer or combinations thereof, may be used. In the present patent application, the term flexible also means articulated (FIGS. 17, 18). The invention can furthermore be used also when the pins 2 are applied at a strip 3A, 3B in some other way than that described above, e.g. a strip or strips in the form of a wire that penetrates holes in the pin, etc., and that combinations of different types of strips/wires can be used in a device, such as strips on one side and wires on the other side. It is also realised that in certain applications, it is adequate with a strip 3A arranged on one side and that as an alternative it can be mounted in a central groove.

It is realised that some of the aspects, e.g. preferred choices of dimensioning parameters according to the invention, also result in benefits in connection with free wheel constructions and that the applicant hence reserves the right e.g. also to direct protection(s) for methods/devices that are intended solely to transmit torque in one direction.

The invention claimed is:

1. A coupling device for force and moment transmission, which coupling device comprises:
    at least one flexible element; and
    a plurality of force-transmitting elements that are held together by said flexible element, wherein said force-transmitting elements have a cross-section that is limited by two opposing contact sides comprising at least two opposing contact zones and two opposing side surfaces being oriented lateral to a longitudinal direction of the device, a cross-sectional dimension measured between parallel tangents for said contact sides having a first cross-sectional dimension and a second cross-sectional dimension, wherein said first cross-sectional dimension is less than said second cross-sectional dimension, in order by friction by wedge-action to be able to transmit forces and moments, wherein said plurality of elements are arranged in relation to said flexible element that, in combination and without external influence of said device, enable transmission of force(s) in two opposite torque directions, wherein a third cross-sectional dimension between said side surfaces laterally thereto is arranged to be larger than a fourth of said first cross-sectional dimension and wherein a curvature radius in said contact zones is larger than 0.4 times said first cross-sectional dimension, and wherein said flexible element is resilient in a direction that is lateral to the longitudinal direction of the force-transmitting elements, wherein said force-transmitting elements and flexible element together form a mat that can be rolled up.

2. The coupling device according to claim 1, wherein said flexible element is arranged in a recess and/or a protruding portion in or at each of said plurality of force-transmitting elements.

3. The coupling device according to claim 2, wherein each of said plurality of force-transmitting elements are in the form of an axially extended groove and/or a circular surface that extends laterally to the longitudinal axis of the respective force-transmitting element, and in that said flexible element comprises a strip, said recess and/or protruding portion being arranged and positioned such that contact points between a first object and a second object are achieved.

4. The coupling device according to claim 3, wherein a total axial extension of said force-transmitting elements is larger than 8-100 times said first cross-sectional dimension.

5. The coupling device according to claim 3, wherein a total axial extension of said force-transmitting elements is larger than about 10-40 times said first cross-sectional dimension.

6. The coupling device according to claim 1, wherein said force-transmitting elements are arranged with curvature radii in said contact zones of the contact sides that are larger than half said first cross-sectional dimension.

7. The coupling device according to claim 6, wherein a sum of the absolute values of the curvature radii at the two contact sides are arranged to be larger than said first cross-sectional dimension.

8. A coupling device according to claim 1, wherein at least parts of the surface of said force-transmitting elements are arranged to have a rough surface achieved by chemical or mechanical means in order to provide an increased coefficient of friction, by said surface roughness.

9. The coupling device according to claim 8, wherein the surface roughness is achieved by sand-blasting and/or a special coating and/or additives.

10. The coupling device according to claim 1, wherein said plurality of force-transmitting elements have, between opposing contact zones, said second cross-sectional dimension at least 5% larger than said first cross-sectional dimension.

* * * * *